(12) United States Patent
Fidler

(10) Patent No.: US 6,371,425 B2
(45) Date of Patent: Apr. 16, 2002

(54) ARTICULATED MECHANISM

(76) Inventor: Terrance J. Fidler, 960 Malaspina Crescent, Nanaimo, British Columbia (CA), V9S 2Z7

( * ) Notice: Subject to any disclaimer, the term of this patent is extended or adjusted under 35 U.S.C. 154(b) by 0 days.

(21) Appl. No.: 09/449,774

(22) Filed: Nov. 26, 1999

(51) Int. Cl.[7] ............................ F16C 11/06; F16M 11/14
(52) U.S. Cl. .............................. 248/288.51; 248/181.1; 403/90; 74/531; 269/75
(58) Field of Search ......................... 403/90; 248/181.1, 248/181.2, 288.31, 288.51; 269/75; 74/531

(56) References Cited

U.S. PATENT DOCUMENTS

| | | | |
|---|---|---|---|
| 3,638,973 A | 2/1972 | Poletti | |
| 3,860,228 A | * 1/1975 | Cronier | ........................ 269/75 |
| 3,958,904 A | 5/1976 | Rusbach | |
| 4,222,680 A | 9/1980 | Browning | |
| 4,527,925 A | 7/1985 | Bauer et al. | |
| 4,606,522 A | * 8/1986 | Heifetz | .................. 248/288.51 |
| 4,616,632 A | 10/1986 | Wigoda | |
| 4,767,231 A | 8/1988 | Wallis | |
| 4,974,802 A | * 12/1990 | Hendren | ...................... 403/90 |
| 5,118,058 A | 6/1992 | Richter | |
| 5,314,174 A | * 5/1994 | Hagman | ...................... 269/75 |
| 5,544,968 A | 8/1996 | Goellner | |
| 5,857,492 A | 1/1999 | Salamun | |
| 5,927,815 A | * 7/1999 | Nakamura et al. | ...... 248/288.15 |

FOREIGN PATENT DOCUMENTS

| | | | | |
|---|---|---|---|---|
| JP | 3-113113 | * | 5/1991 | .................. 403/90 |
| RU | 619702 | * | 8/1978 | .................. 403/90 |
| RU | 635316 | * | 11/1978 | .................. 403/90 |

* cited by examiner

Primary Examiner—Thomas R. Hannon
Assistant Examiner—William C Joyce

(57) ABSTRACT

A joint for an articulated mechanism includes a housing and a rotatable member within the housing. There is a friction member mounted on the housing between the housing and the rotatable member. There is a spring normally biasing the friction member against the rotatable member to inhibit the rotation of the rotatable member. There is an actuator within the housing operatively coupled to the housing. The actuator member moves the friction member away from the rotatable member when actuated to facilitate rotation of the rotatable member. A plurality of joints are used to connect together a series of shafts, some of which may be equipped with clamps or other tools for securing workpieces.

4 Claims, 4 Drawing Sheets

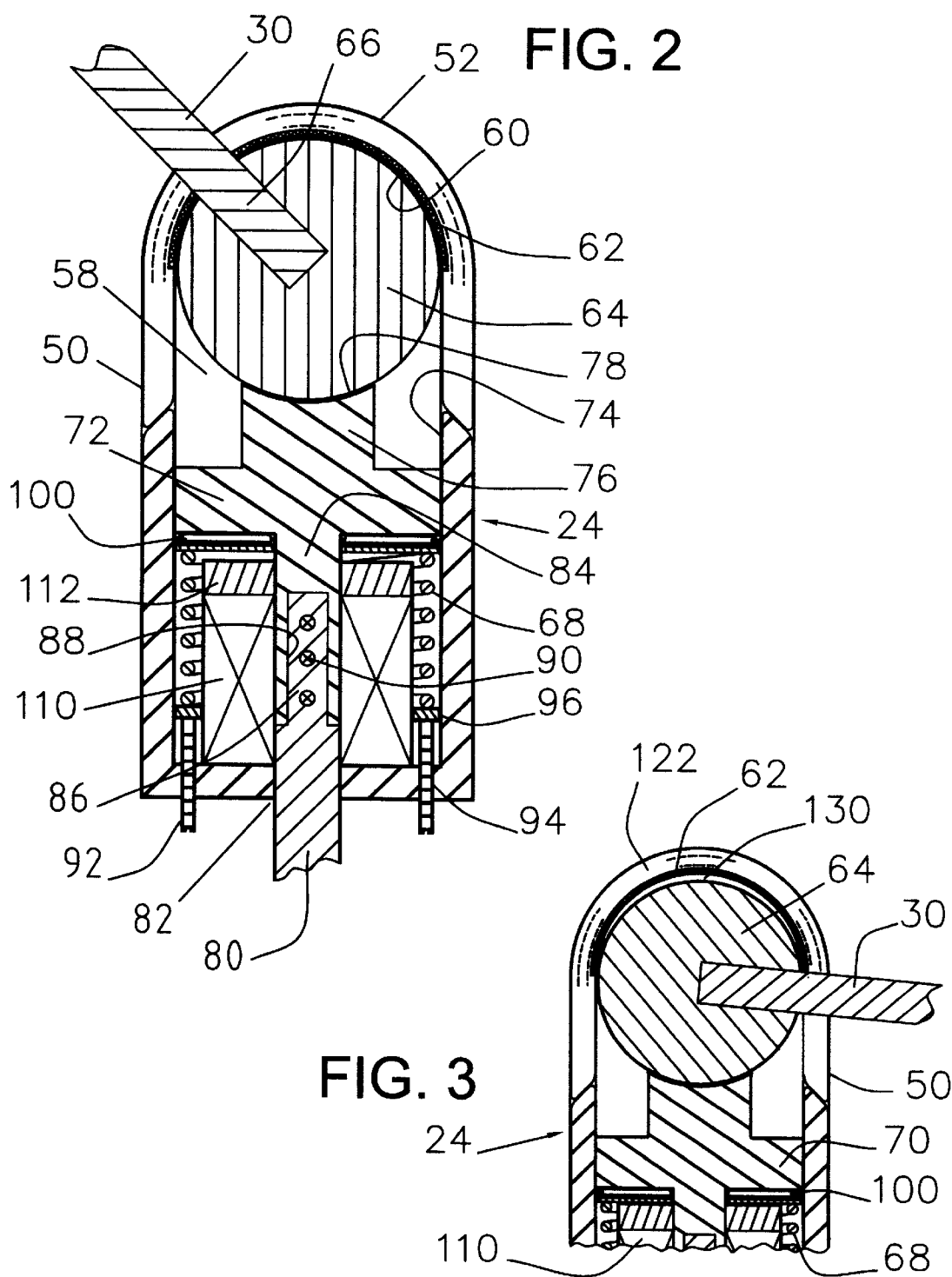

ARTICULATED MECHANISM

BACKGROUND OF THE INVENTION

This invention relates to articulated mechanisms and, in particular, to articulated mechanisms employing joints which can be locked or unlocked to move to a selected position. Various mechanisms have been devised to hold tools or workpieces in a desired position. For example, gooseneck mechanisms have been used for lamps as well as articulated arms. However such devices are not always suitable for tasks where it is desired to hold an object selectively in a fixed position without movement or alternatively to easily allow movement of the object when desired.

Earlier patents show lockable ball joints used on articulating apparatuses of various types. For example U.S. Pat. No. 4,616,632 to Wigoda discloses surgical retractors which include ball joints. Foot controllers allow locking of the joints. One version of the invention employs solenoids.

U.S. Pat. No. 5,857,492 to Salamun discloses an electromagnetic friction lock between a spherical joint and its seat.

U.S. Pat. No. 4,527,925 to Bauer et al. discloses a ball joint having a locking element including a spring.

U.S. Pat. No. 4,606,522 to Heifetz shows a jointed holder for holding articles. It includes ball joints which may be tightened.

U.S. Pat. No. 3,638,973 to Poletti discloses a ball joint where pressurized fluid is utilized to make the joint rigid. One application is a surgical retractor.

U.S. Pat. No. 4,767,231 to Wallis discloses an adjustable arm having ball joints. The joints can be locked by applying a compressive force to a push rod.

Russian Patent SU 611039 describes a lockable ball and socket joint using an electromagnet and a spring-like device.

Despite these prior art devices, however, there is a need for a simple, effective, but easy to use articulated mechanism which employs lockable joints.

SUMMARY OF THE INVENTION

There is provided, according to one embodiment of the invention, a joint for an articulated mechanism. The joint includes a housing and a rotatable member adjacent to the housing. A friction member is mounted on the housing between the housing and the rotatable member. There is a biasing member normally biasing the friction member against the rotatable member to inhibit rotation of the rotatable member. There is an actuator within the housing operatively coupled to the housing which moves the friction member away from the rotatable member when actuated to facilitate rotation of the rotatable member.

There is provided, according to another embodiment of the invention, an articulated apparatus which includes a plurality of shafts and articulated joints between the shafts. Each joint includes a housing, a rotatable member adjacent to the housing and a friction member mounted on the housing between the housing and the rotatable member. A biasing member normally biases the friction member against the rotatable member to inhibit rotation of the rotatable member. There is an actuator within the housing operatively coupled to the housing which moves the friction member away from the rotatable member when actuated to facilitate rotation of the rotatable member.

For example, at least one articulated joint includes a spherical member connected to the shaft. The housing preferably has a first end, a second end and a hollow interior with a semi-spherical recess at the first end. The spherical member is within the housing member adjacent to the semi-spherical recess. The friction member is between the spherical member and the semi-spherical recess. A ferromagnetic member is within the housing on a side of the spherical member opposite the semi-spherical recess and adjacent to the spherical member. The biasing member is a spring biased between the second end of the housing and the ferromagnetic member to bias the ferromagnetic member against the spherical member and thereby bias the spherical member against the semi-spherical recess to resist movement of the spherical member and the shaft. The actuator is preferably a solenoid mounted on the housing within the hollow interior between the second end of the housing and the ferromagnetic member to attract the ferromagnetic member when actuated to free the spherical member and the shaft for movement.

BRIEF DESCRIPTION OF THE DRAWINGS

FIG. 2 is a sectional view of one of the joints thereof, shown in the locked position;

FIG. 3 is a fragmentary sectional view similar to FIG. 2, showing the joint unlocked and with the shaft in a different position;

DETAILED DESCRIPTION OF THE PREFERRED EMBODIMENTS

Figures 1, 1A:
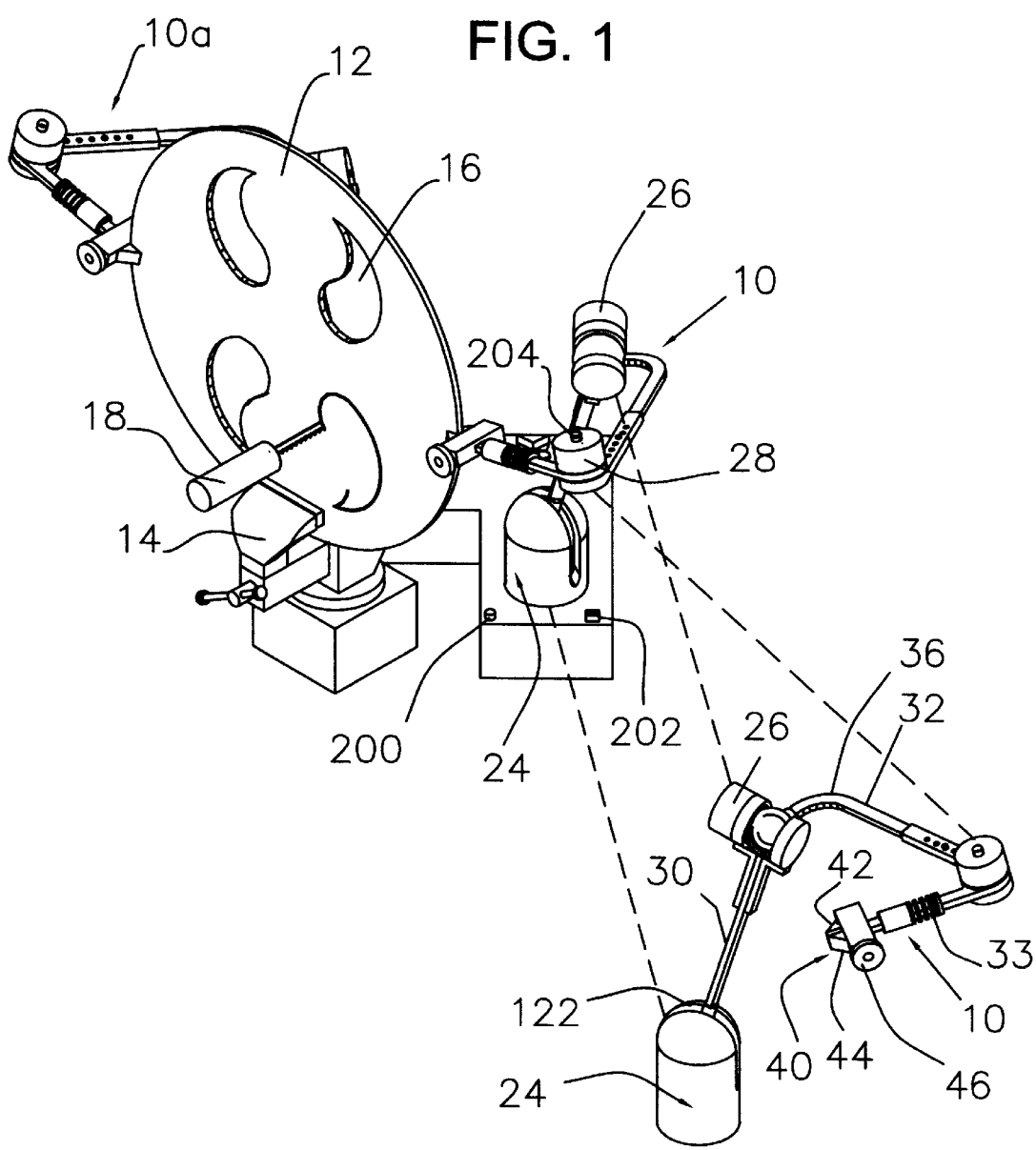
FIG. 1 is an isometric view of a pair of articulated mechanisms, according to an embodiment of the invention, holding a workpiece mounted on a vise.
FIG. 1a is an isometric view of one of the mechanisms of FIG. 1.

Referring to the drawings and first to FIG. 1, this shows a pair of articulated mechanisms 10 and 10a holding a workpiece 12 held in a vise 14. In this example, the workpiece is a disk of sheet metal shown in the process of having a series of teardrop shaped apertures 16 sawn therethrough with a saw 18. However the shape of the workpiece and the tool being employed are merely examples of myriads of other uses for these mechanisms. The mechanism 10a is the same as the mechanism 10 although it is shown in a different position. Thus only mechanism 10 is described in detail below. Both mechanisms are shown mounted on a base 20.

Referring to FIG. 1a, the mechanism includes three joints 24, 26 and 28 and three shafts 30, 32 and 33. Shaft 30 extends between joints 24 and 26 and is straight in this embodiment. Shaft 32 extends between joints 26 and 28 and has a 90° bend 36. Shaft 33 is straight and extends between joint 28 and a clamp 40 which includes a pair of jaws 42 and 44 and an adjustment knob 46 for moving the jaws. It should be understood that the invention is applicable to many other configurations of articulated mechanisms using more or fewer shafts, shafts of different lengths, appearances and shapes and may be used for other tools and objects besides the vise 40. Also the shaft may be straight or bent as illustrated or angled in varying amounts. Also more or fewer joints me be employed.

Joint 24 is shown in better detail in FIGS. 2 and 3. The joint includes a hollow housing 50 which is somewhat capsule-shaped in this example, having a semi-spherical first end 52, a flat end 56 and a hollow interior 58. There is a semi-spherical recess 60 within the housing adjacent the first end 52. This is covered with a high-friction material 62. This is vulcanized rubber in this example but other high-friction materials can be substituted.

A rotatable member, in this example, a spherical member 64, is located within the housing such that the friction member 62 is between the housing and the rotatable member. Shaft 30 fits tightly in a socket 66 in the spherical member and is thus connected thereto. It can be connected in alternative ways such as by threads, adhesive or soldering, depending upon the materials.

There is also a biasing member, in this case a coil spring 68, within the housing and which normally biases the friction member 62 against the rotatable member 64 as seen in the position of FIG. 2. This inhibits movement of the rotatable member and thereby shaft 30. The spring is operatively biased against a ferromagnetic member, in this example plunger 70, which is located within the housing on a side of the spherical member 64 opposite the semi-spherical recess 60. The plunger includes a piston-like portion 72 which slidably engages inside walls 74 of the housing. There is a projection 76 extending towards the spherical member which has a partially spherical surface 78 pressing against the rotatable member 64.

There is a shaft 80, of a non-ferromagnetic material in this example, extending rotatably through circular aperture 82 at end 56 of the housing. The shaft is rigidly connected to shaft-like projection 84 of plunger 70 by means of narrower projection 86 of the shaft fitting within cylindrical recess 88 of the extension. A series of pins 90 secure the two members together. Other means could be used for connecting them together such a adhesives, screws or other known types of connectors.

A series of screws 92 extend threadedly through corresponding threaded apertures 94 in end 56 of the housing. A ring 96 is positioned between the screws and the coil spring 68. Thus the screws can be used to adjust the position of the ring 96 further from or closer to end 56 of the housing and thus increase or decrease the force exerted by the spring 68 on the spherical member 64.

There is a rotary bearing, in this example, a roller bearing race 100 positioned between the coil spring 68 and plunger 70. This allows for rotation of the housing 50 and shaft 30 about rod 80 when the spherical member 64 is unlocked as shown FIG. 2.

A solenoid 110 is positioned within the housing between the plunger 70 and end 56. The solenoid in this example is fitted within the interior of coil spring 68 and extends about rod 80. There is a ferrous alloy ring 112 in this example at the end of the solenoid adjacent to the plunger 70.

FIG. 2 shows the joint 24 in the position where the solenoid is not energized. In this case the coil spring 68 bears against the bearing 100 and plunger 70 to press the rotatable member 64 between plunger 70, the housing and friction member 62. This in turn pushes the plunger against the friction member 62 to lock the joint. Alternatively, looking at the joint from another point of view, it may be also said that the spring pushes against the ring 96 and consequently the housing and thereby pushes the friction member against the rotatable member to lock the joint.

FIG. 3 shows the joint in the position when solenoid 110 is energized. This draws the plunger 70, which is of a ferromagnetic material, together with rotatable member 64, away from the housing 50, thereby creating a gap 130 between the rotatable member and the friction member 62. This permits the shafts 30 to be moved to a different position as shown in FIG. 3.

As seen in FIG. 1a, the shaft 30 is rotatable in a arc about slot 122 in the housing. The rod 80 is not shown in FIG. 1, but can be used to mount the joint on base 20. This allows rotation of the joint about the base. Alternatively, the rod 80 could comprise an additional arm connecting the joint to a tool, another object, or a further joint.

Figure 4:
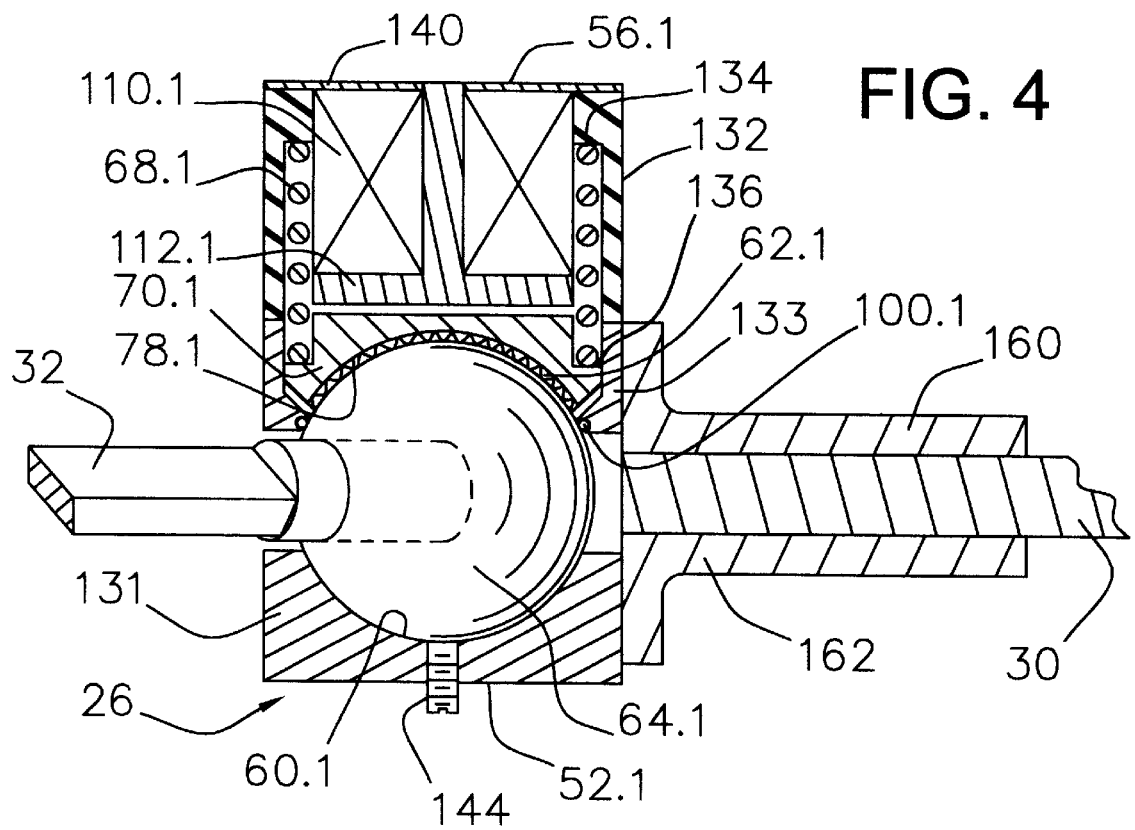
FIG. 4 is a sectional view of a second joint of the mechanism of FIG. 1 in the locked position.
Figure 5:
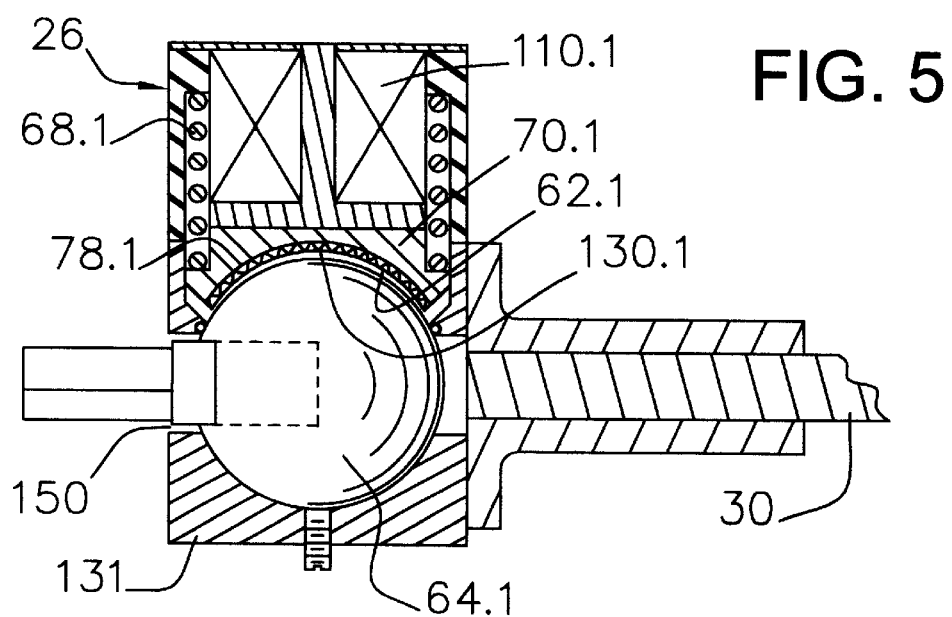
FIG. 5 is a sectional view similar to FIG. 4, showing the joint in the unlocked position and the shaft in a different position.

Referring to FIGS. 4 and 5, these show joint 26 in more detail. Many of the internal components of the joint are generally similar to those of the previous joint and therefore are given the same number with the additional designation ".1". In this example housing 26 is in three parts 131, 132 and 133. In this example, the friction member 62.1 is mounted on partially spherical surface 78.1 of ferromagnetic member 70.1 instead of on semi-spherical surface 60.1 of the housing. Coil spring 68.1 is compressed between shoulder 134 near end 56.1 of the housing and shoulder 136 of the ferromagnetic member. End 56.1 of the housing is covered by a plate 140. The spring normally biases the ferromagnetic member 70.1 towards the rotatable member 64.1 such that the friction member 62.1 engages the rotatable member to inhibit rotation thereof. This effectively locks shafts 30 and 32 in the positions shown. There is an adjustment screw 144, plastic in this example, extending threadedly through end 52.1 of the housing and contacting rotatable member 64.1. This allows adjustment of the resistance to movement of the rotatable member 64.1 inside the housing so that, when solenoid 110.1 is actuated, its looseness can be set or adjusted to the user's preference.

When the solenoid 110.1 is actuated, as shown in FIG. 5, it draws ferromagnetic member 70.1 away from rotatable member 64.1 against the force of the spring 68.1 and thereby creates a gap 130.1 between the rotatable member and the friction member 62.1. This allows rotation of arm 32 about gap 150 in the housing between its two portions 131 and 132 of the housing.

Brackets 160 and 162 connect shaft 30 to portions 131, 132 and 133 of the housing respectively and thereby interconnect the portions of the housing.

The type of articulation permitted by joint 26 is different from that of joint 24. It may be seen that joint 24 allows for axial pivoting of the housing about rod 80 and yaw-like pivoting of shaft 30 relative to the housing. Joint 26 on the other hand permits rotation of member 64.1 axially with respect to the housing and yaw-like pivoting of arm 32 in the gap or plane between the housing components 131, 132 and 133.

Figure 6:
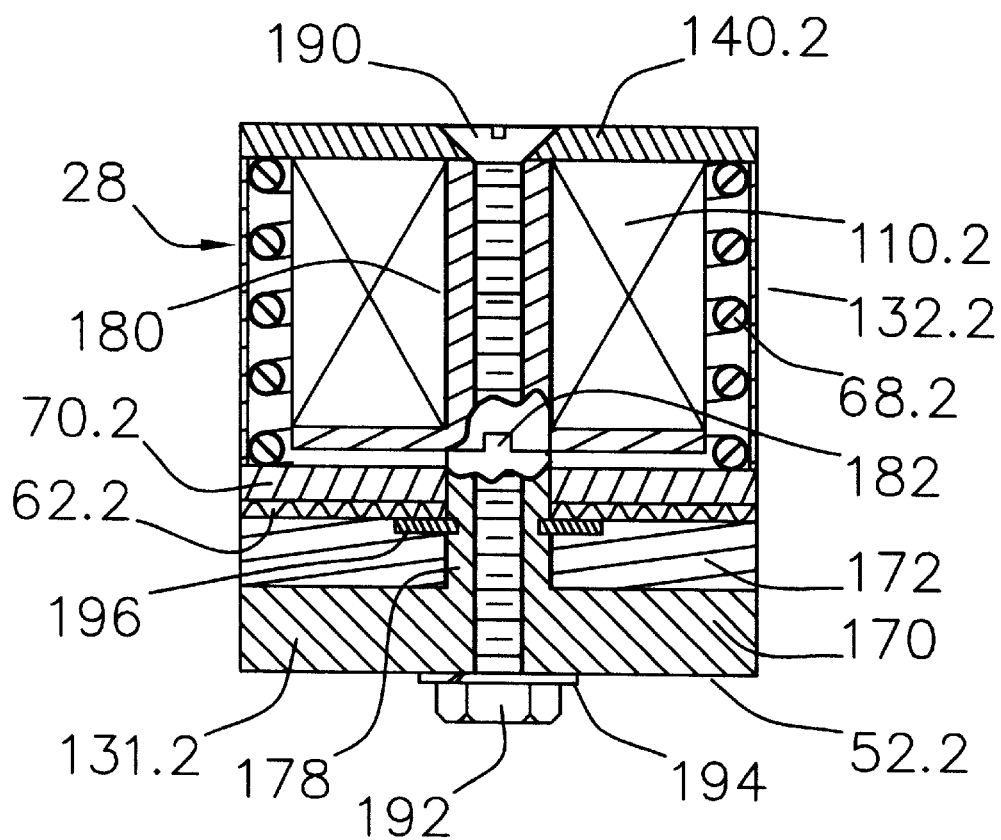
FIG. 6 is sectional view of a third joint of the mechanism of FIG. 1, showing the joint in the locked position.
Figure 7:
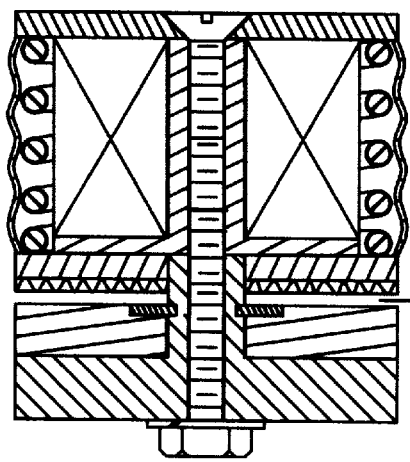
FIG. 7 is a sectional view similar to FIG. 6, showing the joint in the unlocked position.
Figure 8:
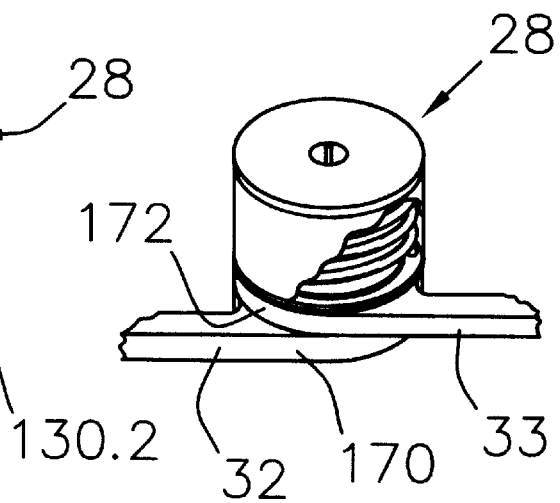
FIG. 8 is an isometric view, partly broken away, of the joint of FIGS. 6 and 7 and fragments of the arms connected thereto.

FIGS. 6, 7 and 8 shows the third joint 28 which permits hinge-like movement of the shafts 32 and 34 about the axis of the housing. In this embodiment like parts have like numbers as in the previous joints with the additional designation of ".2". In this example the housing 28 is in two portions 131.2 and 132.2 similar to the embodiment of FIGS. 4 and 5. End 52.1 of the housing is formed by a disk-like member 170 on the end of arm 32. The rotatable member is not spherical in this embodiment as in the previous embodiments but rather is a disk-like member 172 formed on the end of arm 33. Friction member 62.2 is positioned between ferromagnetic member 70.2 and rotatable member 172.

Disk-like member 170 has a hollow rod 178 which extends towards hollow ferromagnetic core 180 inside solenoid 110.2. A locking tab 182 locks the core 180 and the rod 178 together to prevent relative rotation. The two portions of the housing are held together by a screw 190 extending through the hollow core and the hollow rod 178. The screw is fitted with a nut 192 and washer 194.

There is a C-clip 196 extending about the hollow rod 178 which keeps member 172 and arm 33 in place when the member 172 is released by the solenoid 110.2.

In this embodiment, the spring 68.2 normally biases the ferromagnetic member 70.2 and the friction member 62.2 against the member 172 and thereby inhibits rotation of the member and arm 33 relative to the housing and shaft 32. When the solenoid 110.2 is energized, it draws ferromagnetic member 70.2 together with friction member 62.2 away from member 172, thereby releasing the shaft and forming a gap 130.2 as shown in FIG. 7. This permits relative rotation of the shafts.

FIG. 1 shows a series of switches 200, 202 and 204 which are used to energize the solenoids in joints 24, 26 and 28 respectively.

It will be understood by someone skilled in the art that many of the details provided above are by way of example only and are not intended to limit the scope of the invention which is to be interpreted with reference to the following claims.

What is claimed is:

1. An articulated apparatus including a plurality of shafts and articulated joints. between the shafts, each said joint including a housing, a rotatable member within the housing, the rotatable member including a spherical member, a friction member mounted on the housing between the housing and the rotatable member, a biasing member normally biasing the friction member against the spherical member to inhibit rotation of the rotatable member, and an actuator within the housing operatively coupled to the housing which moves the friction member away from the rotatable member when actuated to facilitate rotation of the rotatable member, the actuator being a solenoid, a ferromagnetic member within the housing being positioned against the spherical member, the solenoid being positioned to attract the housing away from the spherical member when actuated and a bearing between the ferromagnetic member and the housing to permit rotation of the spherical member when the solenoid is actuated.

2. An apparatus as claimed in claim 1, wherein the biasing member is a spring.

3. An apparatus as claimed in claim 2, wherein the spring is a coil spring.

4. An apparatus as claimed in claim 1, wherein at least one said articulated joint has the spherical member connected to one of the shafts, the housing having a first end, a second end and a hollow interior with a semi-spherical recess at the first end, the spherical member being within the housing adjacent to the semi-spherical recess, the friction member being between the spherical member and the semi-spherical recess, the ferromagnetic member being within the housing on a side of the spherical member opposite the semi-spherical recess, and adjacent to the spherical member, the biasing member being a spring biased between the second end of the housing and the ferromagnetic member to bias the ferromagnetic member against the spherical member and thereby bias the spherical member against the semi-spherical recess to resist movement of the spherical member and the shaft, the solenoid being mounted on the housing within the hollow interior between the second end of the housing and the ferromagnetic member to attract the ferromagnetic member when actuated to free the spherical member and the shaft for movement.

\* \* \* \* \*